UNITED STATES PATENT OFFICE.

RUSSELL DEAN BELDEN, OF AKRON, OHIO, ASSIGNOR TO THE MILLER RUBBER COMPANY, OF AKRON, OHIO, A CORPORATION OF OHIO.

ARTIFICIAL SOLE-STOCK OR COMPOSITION MATERIAL.

1,250,418.

Specification of Letters Patent.

Patented Dec. 18, 1917.

No Drawing. Application filed June 8, 1916. Serial No. 102,582.

*To all whom it may concern:*

Be it known that I, RUSSELL DEAN BELDEN, a citizen of the United States, and resident of Akron, Ohio, have invented certain new and useful Improvements in Artificial Sole-Stock or Composition Material, of which the following is a specification.

My present invention relates to improvements in artificial sole stock or composition material designed to be used for the soles of boots and shoes.

The object of the invention is to provide a material having a high abrasion test so that it will be exceedingly durable in use and in fact be equal to or exceed leather in its wear resisting qualities; which will be of a fibrous nature so as to be capable of holding stitches without tearing; which will permit its being readily cut to the proper shape and which will be of a consistency of character which will enable the edge of the sole to be buffed in a manner similar to the ordinary leather sole.

With these objects in view the invention comprises the novel composition and method of making the same hereinafter described and particularly defined by the appended claims.

A specific composition which I have found to possess the characteristics above recited, consists of the following:

| | |
|---|---|
| Crude rubber | 15.25 % |
| Ground cured scrap rubber of pure gum nature | 23.00 % |
| High grade auto tire shoddy | 17.5 % |
| Ground cured tire carcass | 36.00 % |
| Sulfur | 1.125% |
| Gas black | 2.125% |
| Lime | 5.00 % |
| | 100.00 % |

It will be understood, however, that I do not limit myself to the specific proportions used, as these may vary somewhat according to the character of stock desired.

The composition containing the aforesaid ingredients or parts will be colored black by the gas black and it will be obvious that if a different colored sole is desired other coloring material would be substituted according to circumstances of the case.

It will also be obvious that some other suitable alkali might be substituted for the lime without departing from the spirit of my invention.

In manufacturing my improved stock or leather substitute I grind up cured scrap rubber of a pure gum nature, such for example as scrap or worn out inner tubes. I then take cured scrap automobile tire casings and remove the beads and threads, leaving only the friction or cotton fabric coated with rubber, these having a very high grade long staple cotton constituent together with a portion of high grade vulcanized rubber, such as is used in the manufacture of high grade tires, such remaining parts of the tires being placed on the grinding mill, whereby they are reduced to the proper degree of fineness.

This material has been selected due to the fact of this particular combination of high grade rubber with low specific gravity with a proportion of high grade long staple cotton fiber found in high grade tires, resulting in exceedingly low cost with high grade cotton base and this particular combination of cotton and rubber produces a material of low specific gravity which gives to the finished sole the desired quality of density and flexibility without stretch.

The composition above described is then placed on a mixing mill consisting of two rolls, the ratio of speed of which enters very materially into the final result. Ordinary mixing mills used in rubber factories having a decided difference in speed between the back and front rolls, or in other words, the friction between the two rolls quite decidedly pronounced, used ordinarily in grinding in mineral pigments, etc., will not do. It was discovered that this was very detrimental in mixing this combination of materials or compound and it was found necessary to construct a special mill with a much smaller differential. The using of a very slight differential between these two rolls was a dominating feature in producing the final results. The mixture is then reduced to slab form of the required thickness on a calender, cut out into suitable shapes, if desired, and vulcanizing under pressure in a mold in a press, in the ordinary or any desired manner.

What I claim is:—

1. The hereindescribed plastic composition comprising crude rubber, comminuted vulcanized rubber scrap, ground or comminuted vulcanized scrap friction fabric, sulfur and an alkali, in substantially the proportions specified.

2. The hereindescribed plastic composition comprising crude rubber, ground cured scrap rubber of a pure gum nature, auto tire shoddy, ground cured tire carcass, sulfur and lime in substantially the proportions specified.

3. The hereindescribed method of making a plastic composition which consists in mixing together crude rubber, comminuted scrap vulcanized rubber, comminuted ground friction fabric, sulfur and an alkali, in a roller mill, one of the rolls of which has a speed slightly in excess of the other.

In testimony whereof, I affix my signature.

RUSSELL DEAN BELDEN.

Witnesses:
C. A. WOLF,
C. E. ROBERTS.